FIP8102 OR 3,428,898
X5019D X5066R X5067W X5667C
SEARCH ROOM

Feb. 18, 1969 B. B. JACOBSEN ET AL 3,428,898

PILOT SIGNAL CONTROL SYSTEM THAT PRECOMPENSATES OUTGOING SIGNALS FOR DOPPLER SHIFT EFFECTS

Filed Oct. 15, 1965

Inventors
BENT B. JACOBSEN
FREDERICK O. ROE
By Percy P. Lantzy
Attorney

United States Patent Office 3,428,898
Patented Feb. 18, 1969

3,428,898

PILOT SIGNAL CONTROL SYSTEM THAT PRECOMPENSATES OUTGOING SIGNALS FOR DOPPLER SHIFT EFFECTS

Bent Bulow Jacobsen and Frederick Ormesher Roe, London, England, assignors to International Standard Electric Corporation, New York, N.Y., a corporation of Delaware Filed Oct. 15, 1965, Ser. No. 496,312
Claims priority, application Great Britain, Nov. 27, 1964, 48,246/64
U.S. Cl. 325—15 18 Claims
Int. Cl. G01v *13/42*

ABSTRACT OF THE DISCLOSURE

Frequency compensation for Doppler shift effects on signals transmitted between two terminal stations by a satellite is accomplished by transmitting a pilot signal having a given frequency from one station, receiving the returned pilot signal at the originating station after passing through the other station, or after passing through only the satellite, and utilizing the Doppler shifted returned pilot signal and the transmitted pilot signal to pre-compensate the frequency of information signals before transmission and to compensate the frequency of received information signals after reception by controlling the read-out and read-in frequency of variable delay storage devices.

This invention relates to transmitter-receiver equipment.

With the introduction of satellite communication systems and the increasing usage of high speed digital equipment, a method of providing time delay compensation over paths with variable transmission characteristics is becoming more desirable.

The principle of storing the signal for a variable time in order to build out the delay to a fixed value is already known. The storage may take the form of recording the information in analogue or digital form.

An object of the invention is to permit automatic adjustment of the duration of storage, whereby the effective time delay is made substantially independent of the variation in the transmission delay of the original path.

A further object is to permit matching the delay of one componsated path to that of another.

According to the invention there is provided transmitter-receiver terminal equipment for intelligence signal communication over a transmission path subject to Doppler effect due to changes of path length, including means for generating a pilot frequency, means for transmitting and receiving said pilot frequency looped over the transmission path, and means controlled by a difference frequency between the pilot frequency as transmitted and the received looped pilot frequency for compensating the frequency of intelligence signals for the Doppler effect of the transmission path.

Figure 1:
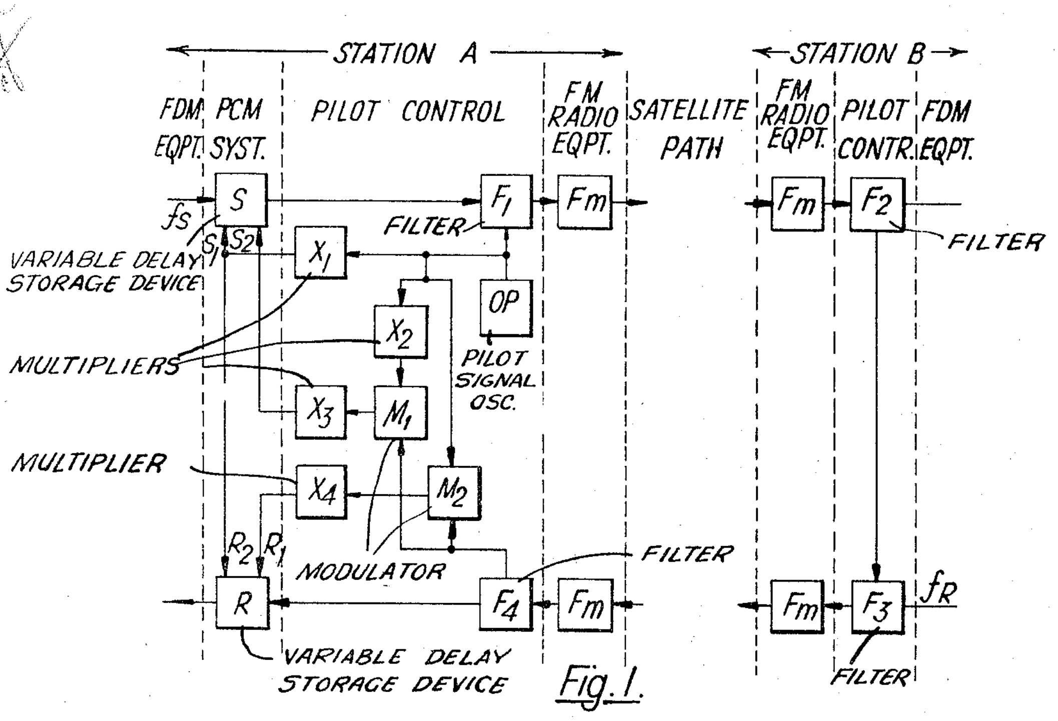
Figure 2:
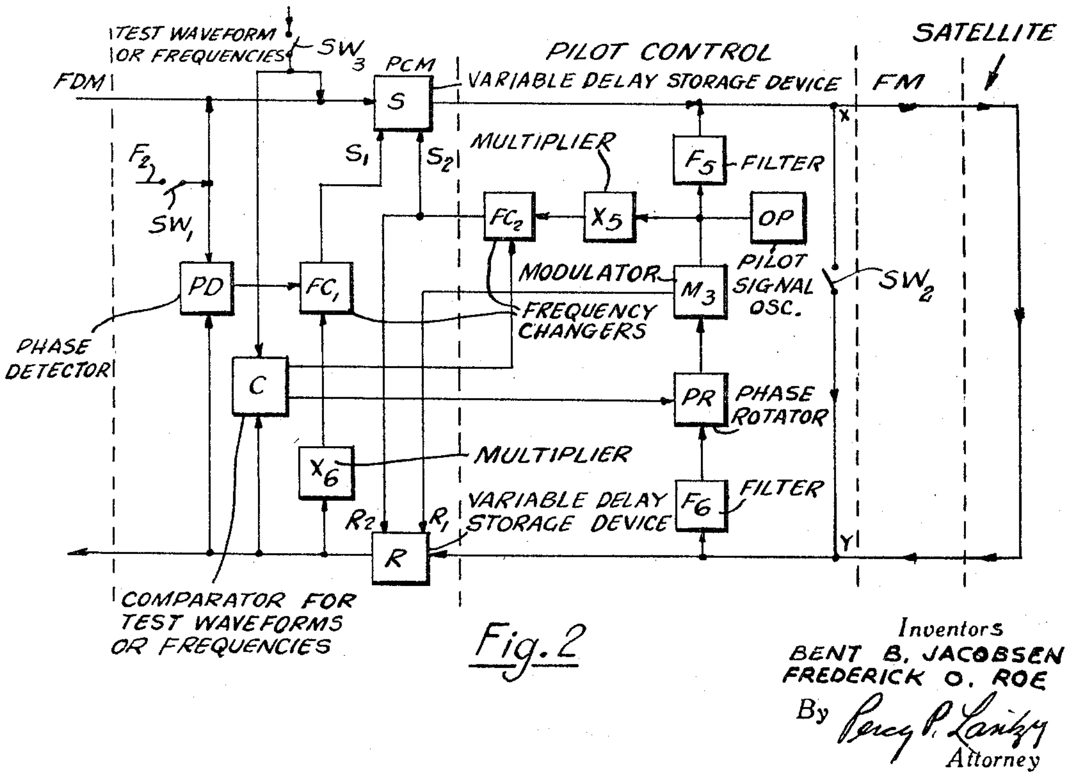

Two preferred embodiments of the invention will now be described with reference to a frequency division multiplex/frequency modulation (FDM/FM) radio satellite communication system and with reference to the accompanying drawings, in which:

FIG. 1 is a block schematic of a satellite communication system comprising two terminal ground stations in which a pilot frequency is looped over the whole of the transmission path between the two stations, and FIG. 2 is a block schematic of part of a satellite communication system comprising a terminal ground station in which one pilot frequency is looped over the part of the transmission path between the terminal station and the satellite, and in which further pilot channels are looped in a similar manner between other terminal stations and the satellite.

In any communication satellite system the length of the paths between the earth stations and the satellite will vary with time. This results in a variation of the transmission delay time and a consequent Doppelr shift of the radio frequencies and also of the baseband frequency spectrum. It is this latter effect which is being considered initially.

This effect is particularly large in non-synchronous satellite systems, and possibly also significant in quasi-synchronous satellite systems.

In a non-synchronous system the maximum transmission delay is experienced as the satellite rises above the horizon, and it is customary to use a minimum aerial elevation of about 5°. It is proposed to maintain the delay at a fixed value by adding controlled delay whereby the effcts of Doppler shift on the FDM baseband frequency range is substantially compensated. Since delay variation and Doppler effect are closely inter-related attention may be restricted initially to consideration mainly of the Doppler shifts in the two directions of transmission.

In a satellite system the R.F. carriers may be widely separated and thus be subject to differing Doppler effects in the up and down directions but initially attention will be concentrated on the baseband (envelope) Doppler effects which are of greater importance.

The PCM systems which are used in the FIGS. 1 and 2 merely by way of example include variable delay storage means between the coding and decoding equipments. The PCM equipments are inserted between the FDM equipment and FM radio equipment, in both the transmitting and receiving directions.

The FDM baseband comprises an assemblage of 12-channel groups into a block of one or more super-groups. This block is sampled at frequency $S_1$ (at least twice the highest baseboard frequency), then coded, and read into the PCM store S. In FIG. 1, the frequency $S_1$ equals $2nP_1$ where $n$ is an integer or an integral ratio, and $P_1$ a pilot frequency derived from oscillator OP and multiplied by $2n$ in multiplier (divider) $X_1$. $n$ may also be a simple fraction or its reciprocal if more complex frequency converters are introduced.

Reconversion to the baseband is then carried out using a "READ-OUT" frequency, $S_2$, determined by the pilot control equipment. This frequency is slightly lower than $2nP_1$ if the satellite path is shortening and slightly greater if the satellite path is increasing, and under the former circumstances, information accumulates in the store S. When the overall path length passes through a minimum, the READ-IN and READ-OUT frequencies tend to be equal. Thereafter the READ-OUT frequency will exceed the READ-IN frequency with the result that the store S begins to emplty. The overall effect is to compensate for the variation in path length in the A to B direction during the whole satellite transit.

Compensation in the B to A direction is provided by PCM equipment R including a receiving store. The frequency $2nP_1$ is used as the READ-OUT frequency but the READ-IN frequency is provided by the pilot control circuit. The store R provides compensation for the B–A direction in a manner similar to the S store for the A–B direction.

The pilot control frequencies are derived in the following manner. The primary pilot frequency $P_1$ is transmitted from the oscillator OP at Station A via a network $F_1$ which enables the pilot to be combined with the time-compensated baseband signals.

The pilot frequency $P_1$ after conversion to the baseband arrives at filter $F_2$ in station B, with the frequency $P_1(1+p_0)$, where $(1+p_0)$ is the A to B Doppler factor. This frequency is now looped via filter $F_3$ for transmission back to Station A. The frequency is further modified to approximately the same extent by the return path so that the frequency appearing at the output of filter $F_4$, which is applied to modulators M1 and M2, is $P_1(1+p_0)^2$. (It is provisionally assumed that $p_0$ changes very slowly with time.)

The modulator M1, which provides the READ-OUT frequency for the S store, devices its carrier frequency $3P_1$ from oscillator OP via the multiplier $X_2$ and the lower sideband is extracted and multiplied by $n$ in multiplier $X_3$. The frequency obtained is $2nP_1$ $$\left(1-P_0-\frac{p_0^2}{2}\right)=S_2$$

The READ-IN frequency $R_1$ for the R store is obtained from modulator M2 by combining the Doppler shifted returned pilot with the original $P_1$ pilot and extracting the upper sideband frequency which is then multiplied by $n$ in multiplier $X_4$ and applied to the R store. The frequency obtained is $$2nP_1\left(1+p_0+\frac{p_0^2}{2}\right)=R_1$$

If now a signal of frequency $f_S$ is transmitted from Station A via the PCM equipment S, it is converted to $$f_s\left(1-p_0-\frac{p_0^2}{2}\right)$$

by the S store the factor being the ratio of the READ-OUT ($S_2$) to the READ-IN ($S_1$) frequency. Assuming that the Doppler factor is essentially unchanged at $$(1+p_0)$$

then the product $$(1+p_0)\left(1-p_0-\frac{p_0^2}{2}\right)$$

gives the baseband frequency at Station B, namely $$f_s\left(1-\frac{3}{2}p_0^2-\frac{p_0^3}{2}\right)$$

It might be noted that $p_0$ is very small compared to unity.

Similarly in the B–A direction if a frequency $f_R$ is sent from B this will be received at the input to the R store as $f_R(1+p_0)$. The modification introduced by the R store is $$1/\left(1+p_0+\frac{p_0^2}{2}\right)$$

so that the overall result is that the received signal in the FDM baseband at A is $$f_R\left(\frac{p_0^2}{2}+\frac{p_0^3}{2}\right)$$

(ignoring higher order terms).

It will thus be seen that the frequency errors in both directions have been reduced to second order effects. However the derived storage regulating frequencies are partly based on $p$ values encountered on the previous round trip through the satellite, so that the calculated reduction will not be exactly achieved where $p$ changes magnitude during a round trip. Nevertheless for many purposes the degree of delay compensation obtained will be acceptable.

Further compensation can be achieved somewhat as described in connection with FIG. 2 by means of a secondary pilot which is transmitted round the baseband loop, including the S and R stores. Means for adjusting the overall transmission delay to substantially the same value for each individual satellite in turn are also described later.

Multiple access is a very desirable feature of satellite systems. "Half-loop" control, whereby each earth station provides delay compensation for its own earth-satellite paths, facilitates the operation of such a feature and will next be described in detail with reference to FIG. 2.

In connection with FIG. 2 the case of a moving satellite will be again considered. On the basis of the classical theory, a frequency transmitted from the earth station to a moving satellite will be subject to a Doppler factor $(1-p)$ where $p$ is the ratio of the component of the satellite velocity of separation along the earth-satellite path to the velocity of light. This ratio varies with time. The frequency change from the moving satellite transmitter to the earth station has the Doppler factor $(1/1+p)$. Thus the overall effect for a looped circuit is $$\frac{1-p}{1+p}$$

It will be assumed that the transit time through the satellite may be neglected, and in order to simplify the description FIG. 2 has been reduced to the bare essentials, so that radio frequency equipment and the equipment in the satellite have been shown as straight lines, although demodulation to baseband and remodulation or some method of frequency translation will be required at the satellite. Only details of Station A are shown. Station B is similar to Station A although a different pilot frequency may be required. In order to simplify the description further the ratio between the PCM sampling frequencies and the pilot frequency $F_1$ has been restricted to 2. In practice this is not a desirable ratio, but this can be readily avoided by using more complex frequency converters than the simple multipliers $X_5$ and $X_6$ of FIG. 2 referred to below.

Referring to FIG. 2 a primary pilot frequency $F_1$ transmitted from Station A from oscillator OP via filter $F_5$ and combined with the compensated FDM block is returned from the satellite and will arrive back to Station A with the frequency $$F_1\left(\frac{1-p}{1+p}\right)$$

combining this frequency, after filtering in filter $F_6$, with the frequency $F_1$, in modulator M3 and choosing the upper sideband the frequency $$\frac{2F_1}{1+_1}$$

is obtained which is used as the READ-IN frequency $R_1$ for the receiving store R.

The frequency $F_1$ is multiplied by 2 in multiplier $X_5$ and used as the READ-OUT frequency $R_2$ for the store R.

The modification factor introduced by store R is equal to $R_2/R_1=(1+p)$. The overall effect in the incoming direction on a wave from the satellite is the product of this quantity $(1+p)$ and the path effect $1/1+p$ which cancel one another resulting in complete compensation for the incoming satellite-earth path.

The pilot frequency at the FDM output of store R is $F_1(1-p)$ which after multiplication by 2 in multiplier $X_6$ is used as the READ-IN frequency $S_1$ for the sending store S. The READ-OUT frequency $S_2$ is $2F_1$.

The effect of store S is equal to $S_2/S_1$ or $$\frac{1}{1-p}$$

so that compensation is obtained for the outgoing path also.

However, there is an additional fact which has to be taken into account which results in a residual error. This arises from the fact that while signals transmitted from the satellite, which have come from the distant earth station B, travel concurrently with the returned pilot frequency $F_1$ and will thus be fully compensated, FDM signals passing out of store S to the satellite will have the compensation appropriate for the pilot signal transit just completed, but the satellite will have changed its velocity by the time these signals reach it so that $p$ has now changed slightly. The effect results in slight overcompensation of the Doppler effect in the earth-satellite directions, by an amount approximating to the loop transit time multiplied by the first differential of the Doppler factor. For many purposes this may be acceptable but since the error is always of the same sign there will be a small progressive increase in the delay of the compensated path during a satellite transit and this is undesirable when changing from one satellite circuit to another.

Further compensation is effected by the use of a secondary pilot frequency, $F_2$, fed into the input of store S by switch $SW_1$ in combination with the FDM baseband signals.

The secondary pilot frequency $F_2$ (returned from the satellite) is filtered off at the output of store R. This filtered secondary pilot frequency $F_2$ is passed through a 90° phase network and compared with the original secondary pilot frequency $F_2$ in a phase discriminator PD whose output is used to control known means $FC_1$ for modifying the frequency $2F_1(1-p)$ applied to $S_1$ of store S whereby the frequency difference between the original secondary pilot and the returned secondary pilot will be reduced to a small phase error only. The residual Doppler effect will now depend on the second differential of $p$ which is very small and moreover changes sign during a satellite transit whereby the tendency to progressive increases in delay is reduced.

This further compensation by the use of a secondary pilot frequency may be applied to the system of FIG. 1, with the output of a phase discriminator for comparing the original secondary pilot frequency with the returned pilot frequency being used to modify the frequency $S_2$ of store S.

In order to permit the use of no-break changeover between one satellite path and another it is also necessary to provide means for adjusting the compensated transmission delay for each satellite in turn, to substantially the same value.

Basically this adjustment is carried out by making temporary changes to the READ-OUT frequencies of both the S and R stores simultaneously. Both these frequencies under normal operating conditions (for the purposes of this description) are twice the primary pilot frequency. A temporary frequency change in the appropriate direction will lengthen or shorten the compensated delay time for both directions of transmission by an equal amount. The means for doing this will now be described.

Initially the input circuit to the pilot control equipment should be disconnected from the FM receiving equipment and connected by suitable means such as connection XY and switch $SW_2$, across the pilot control/FM link in the transmitting direction, thus forming a local loop. The local loop introduces no Doppler effects so that all the reading frequencies will be equal. Consequently if the stores had been cleared initially or restored to particular prescribed values this state would continue. The primary pilot frequency received after passing round the satellite loop will initially be slightly higher than the local pilot loop. If the local loop is broken and the receiving path instantly reconnected at a time when the local and the looped primary pilots are momentarily in phase, a state exists in which the pilot system has stabilized with the same number of samples in each store. The READ-OUT frequencies will rapidly adjust themselves to match the path Doppler characteristics, since at this stage the pilot control equipment is not required to introduce much delay.

For the purpose of judging the path delay a sawtoothed waveform, harmonically related to the secondary pilot is connected to variable delay storage device S by switch $SW_3$ and transmitted round the baseband loop XY, including the variable delay equipment S and R which by way of example has been described in terms of PCM equipment with variable digital delay storage.

The period of this recurrent wave should be selected to match the arbitrarily prescribed delay chosen for the particular satellite connection in use. The slowly rising wave front will be used for initial adjustments and the steeply falling accurately adjusted decay characteristic or a sawtooth wave with precisely 10 or 100 times higher recurrence frequency for more precise adjustment.

The transmitted and received waveforms should have the same shape but will in general be subject to a time difference. By sampling them simultaneously at appropriate intervals and comparing them in comparator C, the amplitude difference can be used as a driving source for causing a temporary change through means of frequency changer $FC_2$ to the READ-OUT frequencies of both the S and R stores, thus resulting in the compensated delay in both directions of transmission being adjusted to the prescribed value.

Instead of a sawtooth wave, a number of exactly related test frequencies are coupled through switch $SW_3$ and transmitted in turn round the baseband loop, including the variable delay equipment, for instance as follows:

If, for example, a delay of 150 msecs. is required a frequency of 20 c./s. is transmitted which gives a delay ambiguity of $\pm 50$ milliseconds and a resolving power of say $\pm 125$ microseconds. Having completed adjustment at this frequency, other frequencies are applied in turn, for example 4 kc./s., 60 kc./s., and 600 kc./s., the resolving power of the latter being about 4 msecs. or less.

The looped test frequencies may be compared with the transmitted frequencies in a phase detector contained in comparator C and the output used to operate a phase rotator PR connected between $F_6$ and $M_3$. Alternatively, in order to increase the speed of operation, it is possible to use modulating circuits arranged in such a way that the output from an auxiliary low frequency oscillator, under the control of the detected output, is used to vary the looped pilot frequency over a small frequency range which includes the input pilot frequency.

No matter which kind of phase rotation is used the effect of giving two complete phase rotations to the looped pilot frequency is to cause a $\pm 1$ change in the number of samples contained in the stores of both S and R equipments.

So far only the baseband frequencies have been compensated for Doppler effects, but it has also been found possible to compensate the radio frequencies also based on the same pilot frequencies. This is of particular interest in the earth to satellite direction of systems using multiple access.

The satellite to earth path could also be compensated if necessary by this method.

Consider a satellite system in which the radio frequency carriers are obtained by multiplication. If the basic frequency is chosen to lie within the baseband frequency range then it may be passed through the transmitting PCM equipment before multiplication so that all the frequencies arriving at the satellite would be compensated for Doppler effects.

Alternatively the outgoing mean radio frequency may be controlled by reference to a multiple of the secondary pilot frequency which has passed through the S store.

What we claim is:

1. Transmitter-receiver terminal equipment for intelligence signal communication over a transmission path subject to Doppler effect due to changes in the length of said path, said path including an outgoing transmission path portion, an incoming transmission path portion, and an interconnecting means between said outgoing and incoming path portions at a point remote from said equipment, comprising:

first means for generating at least a first pilot frequency signal;

first storage means having an intelligence signal input terminal, an intelligence signal output terminal, a READ-IN control terminal and a READ-OUT control terminal;
an intelligence signal source coupled to said input terminal;
second means coupled to said output terminal, said first means and the input of said outgoing path portion to transmit said first pilot signal and said intelligence signal over said path;
third means coupled to the output of said incoming path portion to receive said first pilot signal and said intelligence signal after being transmitted through said path;
fourth means coupled to at least said first means to produce a first control signal and couple said first control signal to one of said control terminals;
fifth means coupled to at least said third means to produce a second control signal and couple said second control signal to the other of said control terminals; and
said first and second control signals cooperatively controlling the READ-IN and READ-OUT of said first storage means to precompensate the frequency of said intelligence signal on said path for the Doppler effect of said path.

2. Equipment according to claim 1, wherein
said first control signal is coupled to said READ-IN control terminal;
said second control signal is coupled to said READ-IN control terminal;
said fourth means is coupled to said first means to produce said first control signal; and
said fifth means is coupled to said first means and said third means to produce said second control signal.

3. Equipment according to claim 1, wherein
said first control signal is coupled to said READ-OUT control terminal;
said second control signal is coupled to said READ-IN control terminal;
said fourth means is coupled to said first means to produce said first control signal, and
said fifth means is coupled to said first means to produce said second control signal.

4. Equipment according to claim 1, further including
a second storage means having an intelligence signal input terminal coupled to said third means, an intelligence signal output terminal, a READ-IN control terminal, and a READ-OUT control terminal;
said first control signal being coupled to one of said control terminals of said second storage means;
sixth means coupled to at least said third means to produce a third control signal and couple said third control signal to the other of said control terminals of said second storage means; and
said first and third control signals cooperatively controlling the READ-IN and READ-OUT of said second storage means to post compensate the frequency of said intelligence signal on said path for the Doppler effect of said path.

5. Equipment according to claim 4, wherein
said fifth means is coupled to said output terminal of said second storage means to produce said second control signal and couple said second control signal to said READ-IN terminal of said first storage means.

6. Equipment according to claim 4, wherein
said first control signal is coupled to said READ-OUT terminal of said second storage means,
said third control signal is coupled to said READ-IN terminal of said second storage means;
said fourth means is coupled to said first means to produce said first control signal; and
said sixth means is coupled to said first means and said third means to produce said third control signal.

7. Equipment according to claim 4, wherein
said first control signal is coupled to said READ-OUT terminal of said second storage means and said READ-IN terminal of said first storage means;
said second control signal is coupled to said READ-OUT terminal of said first storage means;
said third control signal is coupled to said READ-IN terminal of said second storage means;
said fourth means is coupled to said first means to produce said first control signal;
said fifth means is coupled to said first means and said third means to produce said second control signal, and
said sixth means is coupled to said first means and said third means to produce said third control signal.

8. Equipment according to claim 4, wherein
said first control signal is coupled to said READ-OUT terminal of both said first and second storage means;
said second control signal is coupled to said READ-IN terminal of said first storage means;
said third control signal is coupled to said READ-IN terminal of said second storage means;
said fourth means is coupled to said first means to produce said first control signal;
said fifth means is coupled to said signal output terminal of said second storage means; and
said sixth means is coupled to said first means and said third means to produce said third control signal.

9. Transmitter-receiver terminal equipment for intelligence signal communication over a transmission path subject to Doppler effect due to changes in the length of said path, said path including an outgoing transmission path portion, an incoming transmission path portion, and an interconnecting means between said outgoing and incoming path portions at a point remote from said equipment, comprising:
first means for generating at least one pilot frequency signal;
second means coupled to said first means and the input of said outgoing path portion to transmit said one pilot frequency signal over said path;
third means coupled to the output of said incoming path portion to receive said one pilot frequency signal after being transmitted through said path;
fourth means coupled to said first means, said second means, and said third means controlled by a predetermined frequency relationship between the frequency of said one pilot frequency signal as transmitted and the frequency of said one pilot frequency signal as received to compensate the frequency of intelligence signals on said path for the Doppler effect of said path; and
an intelligence signal source;
said fourth means including
fifth means coupled between said source and said second means for causing said intelligence signal to be transmitted at a frequency substantially precompensated for the Doppler effect to be encountered during transmission over said outgoing path portion;
wherein
said first means generates a second pilot frequency signal;
sixth means couples said second pilot frequency signal to said fifth means to precompensate the frequency of said second pilot frequency signal to the same extent as said intelligence signal to be transmitted;
said second means transmits said precompensated second pilot frequency signal over said path;
said third means receives said precompensated second pilot frequency signal from said path; and
said fourth means further includes
seventh means coupled to said third means and said first means to post compensate said received second pilot frequency signal for the Doppler effect encountered during transmission over said incoming path portion;

eighth means coupled to said first means and said seventh means to produce a control signal in response to a frequency difference between said second pilot frequency signal as generated and said post compensated received second pilot frequency signal; and ninth means coupled to said eighth means and said fifth means to provide a further precompensation of the frequency of said intelligence signal to be transmitted.

10. Equipment according to claim 9, wherein said fifth means includes a first variable delay storage device for intelligence signals to be transmitted;

said first storage device having a READ-IN terminal coupled to said first means to provide a READ-IN frequency for said first storage device which is a function of the frequency of said one pilot frequency signal as transmitted and a READ-OUT terminal coupled to said third means to provide a READ-OUT frequency for said first storage device which is a function of the frequency of said one pilot frequency signal as received.

11. Equipment according to claim 10, wherein said seventh means includes a second variable delay storage device for received intelligence signals;

said second storage device having a READ-IN terminal coupled to said third means and said first means to provide a READ-IN frequency for said second storage device which is a function of the frequency of said one pilot frequency signal as received and a READ-OUT terminal coupled to said first means to provide a READ-OUT frequency for said second storage device which is a function of the frequency of said one pilot frequency signal as transmitted.

12. Equipment according to claim 11, further including tenth means coupled to said first and second storage devices for rendering equal the contents of both said storage devices; and eleventh means coupled to said first and second storage devices for simultaneously adjusting the compensated delay of both said storage devices to a prescribed value.

13. Equipment according to claim 12, further including twelfth means coupled to both said storage devices to temporarily render said READ-IN frequencies of both said storage devices equal to the READ-OUT frequencies of both said storage devices; and thirteenth means coupled to both said storage devices to restore said READ-IN frequencies of both said storage devices as functions of said received one of said pilot frequency signal when said received one of said pilot frequency signal is momentarily in phase with said one pilot frequency signal as transmitted.

14. Equipment according to claim 9, wherein said fifth means includes a first variable delay storage device for intelligence signals to be transmitted;

said first storage device having a READ-IN terminal coupled to said third means to provide a READ-IN frequency for said first storage device which is a function of the frequency of said one pilot frequency signal as received and a READ-OUT terminal coupled to said first means to provide a READ-OUT frequency for said first storage device which is a function of the frequency of said one pilot frequency signal as transmitted.

15. Equipment according to claim 14, wherein said seventh means includes a second variable delay storage device for received intelligence signals;

said second storage device having a READ-IN terminal coupled to said third means and said first means to provide a READ-IN frequency for said second storage device which is a function of the frequency of said one pilot frequency signal as received and a READ-OUT terminal coupled to said first means to provide a READ-OUT frequency for said second storage device which is a function of the frequency of said one pilot frequency signal as transmitted.

16. Equipment according to claim 15, further including tenth means coupled to said first and second storage devices for rendering equal the contents of both said storage devices; and eleventh means coupled to said first and second storage devices for simultaneously adjusting the compensated delay of both said storage devices to a prescribed value.

17. Equipment according to claim 16, further including twelfth means coupled to both said storage devices to temporarily render said READ-IN frequencies of both said storage devices equal to the READ-OUT frequencies of both said storage devices; and thirteenth means coupled to both said storage devices to restore said READ-IN frequencies of both said storage devices as functions of said received one of said pilot frequency signal when said received one of said pilot frequency signal is momentarily in phase with said one pilot frequency signal as transmitted.

18. Equipment according to claim 9, wherein said seventh means includes a variable delay storage device for received intelligence signals;

said storage device having a READ-IN terminal coupled to said third means and said first means to provide a READ-IN frequency for said storage device which is a function of the frequency of said one pilot frequency signal as received and a READ-OUT terminal coupled to said first means to provide a READ-OUT frequency for said storage device which is a function of the frequency of said one pilot frequency signal as transmitted.

References Cited

UNITED STATES PATENTS

| | | | |
|---|---|---|---|
| 2,529,510 | 11/1950 | Manley | 343—7.5 |
| 3,188,569 | 6/1965 | Mahoney | 178—69.5 X |
| 3,201,692 | 8/1965 | Sichak et al. | 325—17 |
| 3,222,672 | 12/1965 | Forestier | 343—7.5 |
| 3,351,858 | 11/1967 | Jowett et al. | 325—15 |
| 3,363,180 | 1/1968 | Geissler | 325—4 |

FOREIGN PATENTS 230,517 11/1958 Australia.

ROBERT L. GRIFFIN, *Primary Examiner.*

B. V. SAFOUREK, *Assistant Examiner.*

U.S. Cl. X.R.

325—17, 63; 343—179